United States Patent Office 2,931,010
Patented Mar. 29, 1960

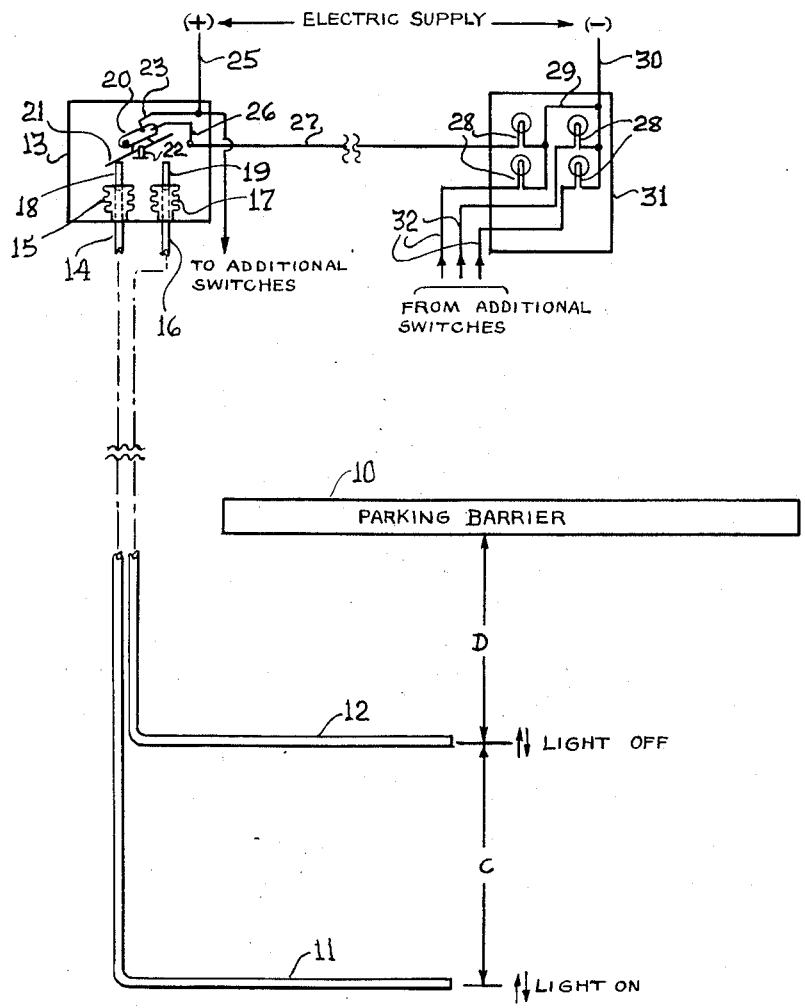

2,931,010

PNEUMATIC INDICATING SYSTEM

Charles J. Geiser, Chicago, Ill.

Application December 16, 1958, Serial No. 780,805

3 Claims. (Cl. 340—51)

My invention relates to new and useful improvements in a pneumatic indicating system and more particularly to a pneumatically operated system for indicating the availability of an automobile parking area.

A further object of my invention is in the provision in an apparatus of this character of a pneumatically operated switch means for energizing parking stall indicating lights which inform motorists or parking attendants as to the presence or absence of an automobile in individual parking stalls.

Another object of my invention is in the provision in an apparatus of this character of a switch means which remains in an actuated position which position depends on the last pneumatic impulse received thereon.

Another object of my invention is in the provision of an apparatus of this character of a simplified switch actuating means which is pneumatically operated.

Other objects will appear hereinafter.

The invention consists in the novel combination and arrangement of parts to be hereinafter described and claimed.

The invention will be best understood by reference to the accompanying drawings showing the preferred form of construction and in which:

Fig. 1 is a schematic diagram of my improved invention.

My improved invention as hereinafter described is primarily designed to indicate the occupancy or an empty condition of an automobile parking stall. While the invention would primarily serve this application, it is noted that it need not be so confined.

Referring to the drawings, I indicate a parking stall or area having a parking barrier 10 adjacent which one end of an automobile is adapted to be parked. Pneumatic tubes 11 and 12 have a portion thereof extending transversely of the parking stall in spaced parallel relation with respect to each other and with respect to the parking barrier 10. The free end of the tubes 11 and 12 are closed in any suitable fashion.

The tubes 11 and 12 have their opposite ends connected to a switch housing 13 adjacently or remotely located with respect to the parking stall. The tube 11 has its one end 14 connected to a bellows unit 15 while the tube 12 has its end 16 connected to a corresponding bellows 17. It should be noted that the bellows 15 and 17 are conveniently connected to the switch housing 13. Each of the bellows 15 and 17 carries a movable plunger 18 and 19 respectively.

Within the housing 13 is a switch unit 20. This switch unit 20 is preferably of the mercury type or the like. The switch unit 20 is fixedly mounted to a pivotal switch bracket 21. This switch bracket 21 is pivotally mounted as at 22 to a suitable bracket within the housing 13. The plungers 18 and 19 of the bellows 15 and 17 respectively are adapted to selectively engage opposite ends of the switch bracket 21 so as to cause the same to be pivoted about the pivotal connection 22. The switch unit 20 has a conductor 23 connected to one side 25 of a power source. The switch unit 20 has a spaced switch conductor 26 which is in turn connected to a conductor 27 which is in circuit with a light element 28 which in turn has a conduit 29 connected to the opposite side 30 of the electrical power source.

An indicating panel 31 provides a plurality of indicating light elements corresponding to the light elements 28. It should be noted that each of the indicating lights on the control panel 31 are connected to one side 30 of the power source and have conduit connections 32 which are in turn connected to one side of additional switch members, not shown.

In operation, when the automobile depresses pneumatic tube 11 by having the tires thereof, ride over it in either direction, such action will cause the bellows 15 to expand causing its plunger 18 to engage one end of the switch bracket 21 to pivot the same about the pivotal connection 22 to cause the mercury in the switch unit 20 to engage the ends of the conduits 23 and 26 to complete a circuit to the light element 28. As the automobile progresses into its parking position, it will depress tube 12 which will in turn actuate the bellows 17 causing the plunger 19 to pivot the switch 20 into the position shown in the drawings breaking the circuit to the light elements 28 indicating that the parking stall is occupied. It should be noted that the switch 20 will remain closed or open depending upon the last operating action which was received from either of the tubes 11 or 12. The tubes 11 and 12 will be spaced from each other and from the parking barrier 10 as indicated by "C" and "D" to obtain the required sequential pneumatic action from a car entering or leaving the parking stall.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A pneumatically operated indicating system comprising a plurality of electrically illuminated indicating lights carried by an indicating panel, an electric circuit for each of said lights including a mercury switch member, pivotal supporting means for said switch member, pneumatically actuated means for pivoting each of said switch members into an operative position to complete an electric circuit for its associated light, pneumatically actuated means for pivoting each of said switch members into an inoperative position for deenergizing said circuit of said switch's corresponding lights, each of said pneumatically actuated means comprises spaced apart parallelly extending pneumatic tubes, expandible bellows at one end of each of said tubes and providing a movable plunger engageable with said pivotal supporting means for said switch and adapted to pivot said switch into an operative or inoperative position in response to the final compressing of either of said tubes.

2. A pneumatically operated indicating system comprising a plurality of electrically illuminated indicating lights carried by an indicating panel, an extension of electrical circuits from a multiple of indicating panels to actuate one or a multiple of area supervisory indicating panels, an electric circuit for each of said lights, a pivotal switch member in said circuit for each of said lights, pneumatically actuated means for pivoting each of said switch means into an operative position to complete an electric circuit for its associated light, pneumatically actuated means for pivoting each of said switch means into an inoperative position for deenergizing said circuit of said switch's corresponding lights, each of said pneumatically actuated means comprises spaced apart parallelly extending pneumatic tubes, expandible bellows at one end of each of said tubes and providing a movable plunger engageable with said pivotal switch and adapted to pivot said switch into an operative or inoperative position in response to the final compressing of either of said tubes.

3. An indicating system comprising a plurality of electrically illuminated indicating lights carried by a remotely located indicator panel, an electric circuit for each of said lights, a remotely located switch member in said circuit for each of said lights, a pivotal support for each of said switch members, two consecutively pneumatically operated sensing members to monitor the position of a remotely located monitored object, and expandable bellows-type elements provided by each of said sensing members for consecutively pivoting in one direction said pivotal support and switch member carried thereby for effecting the condition of said circuit for each of said lights.

References Cited in the file of this patent

UNITED STATES PATENTS

| | | |
|---|---|---|
| 1,836,655 | Dunford | Dec. 15, 1931 |
| 2,578,046 | Cooper et al. | Dec. 11, 1951 |
| 2,796,599 | King | June 18, 1957 |
| 2,827,626 | DeMotte | Mar. 18, 1958 |
| 2,843,845 | Vozza | July 16, 1958 |